United States Patent
Jardin et al.

(10) Patent No.: US 6,912,588 B1
(45) Date of Patent: Jun. 28, 2005

(54) SYSTEM AND METHOD FOR MANAGING CLIENT REQUESTS IN CLIENT-SERVER NETWORKS

(75) Inventors: Cary A. Jardin, San Diego, CA (US); Steven Schnetzler, Valley Center, CA (US)

(73) Assignee: Intel Corporation, Santa Clara, CA (US)

(*) Notice: Subject to any disclaimer, the term of this patent is extended or adjusted under 35 U.S.C. 154(b) by 1282 days.

(21) Appl. No.: 09/054,304

(22) Filed: Apr. 2, 1998

(51) Int. Cl.[7] .............................................. G06F 15/173
(52) U.S. Cl. ...................................................... 709/238
(58) Field of Search ................................ 709/202, 203, 709/217, 218, 245, 230, 219, 238, 239, 227, 226; 707/10

(56) References Cited

U.S. PATENT DOCUMENTS

| | | | | |
|---|---|---|---|---|
| 4,823,122 A | * | 4/1989 | Mann et al. ............ 340/825.28 |
| 5,136,716 A | * | 8/1992 | Harvey et al. ............... 709/203 |
| 5,163,131 A | * | 11/1992 | Row et al. ................... 709/202 |
| 5,210,824 A | * | 5/1993 | Putz et al. ................... 707/523 |
| 5,218,697 A | * | 6/1993 | Chung ......................... 709/230 |
| 5,249,293 A | * | 9/1993 | Schreiber et al. ........... 709/203 |
| 5,329,619 A | | 7/1994 | Page et al. ................... 395/200 |
| 5,341,477 A | | 8/1994 | Pitkin et al. ................. 395/200 |
| 5,371,852 A | | 12/1994 | Attanasio et al. ........... 395/200 |
| 5,434,852 A | * | 7/1995 | La Porta et al. ............. 370/385 |
| 5,446,896 A | * | 8/1995 | Hegarty et al. ................. 707/1 |
| 5,475,819 A | * | 12/1995 | Miller et al. ................. 709/203 |
| 5,506,984 A | * | 4/1996 | Miller .......................... 707/10 |
| 5,544,320 A | * | 8/1996 | Konrad ........................ 709/203 |
| 5,548,726 A | * | 8/1996 | Pettus ......................... 709/230 |
| 5,604,896 A | * | 2/1997 | Duxbury et al. ....... 395/500.47 |
| 5,644,720 A | * | 7/1997 | Boll et al. ................... 709/227 |
| 5,708,832 A | | 1/1998 | Inniss et al. ................. 395/800 |
| 5,748,897 A | * | 5/1998 | Katiyar ........................ 709/219 |
| 5,774,660 A | | 6/1998 | Brendel et al. ......... 395/200.31 |
| 5,778,174 A | * | 7/1998 | Cain ............................ 713/201 |
| 5,787,281 A | * | 7/1998 | Schreiber et al. ........... 709/304 |
| 5,796,934 A | * | 8/1998 | Bhanot et al. .................. 714/4 |
| 5,819,271 A | * | 10/1998 | Mahoney et al. ............. 707/10 |
| 5,822,563 A | * | 10/1998 | Sitbon et al. ................ 709/203 |
| 5,826,270 A | * | 10/1998 | Rutkowski et al. ........... 707/10 |
| 5,828,847 A | * | 10/1998 | Gehr et al. .................. 709/239 |
| 5,881,230 A | * | 3/1999 | Christensen et al. ........ 709/203 |
| 5,978,577 A | * | 11/1999 | Rierden et al. .............. 395/610 |
| 5,991,808 A | * | 11/1999 | Broder et al. ............... 709/226 |
| 6,006,264 A | * | 12/1999 | Colby et al. ................ 709/226 |
| 6,018,805 A | * | 1/2000 | Ma et al. ........................ 714/4 |
| 6,058,425 A | * | 5/2000 | White .......................... 709/227 |
| 6,097,882 A | * | 8/2000 | Mogul .................... 395/200.31 |

FOREIGN PATENT DOCUMENTS

| | | |
|---|---|---|
| EP | 0 865 180 A2 | 9/1998 |
| GB | 2281793 A * | 3/1995 |

OTHER PUBLICATIONS

"Classical versus Transparent IP Proxies", RFC 1919, 1996.*
"Distributed File Systems: Concepts and Examples", Levy et al., ACM 1990.*
"Hiding Distribution in Distributed Systems", Banatre, IEEE 1991.*
"Distributed Systems Concepts and Design", Coulouris et al., 1994, pp. 10–21, especially section entitled Transparency.*
E. Anderson, et al., "The Magicrouter, An Application of Fast Packet Interposing", May 1996, pps. 1–12.
Richard M. Adler, "Distributed Coordination Models for Client/Server Computing", Computer, vol. 28, No. 4, pps. 14–22, Apr. 1995.

* cited by examiner

*Primary Examiner*—Kevin J. Teska
*Assistant Examiner*—William Thomson
(74) *Attorney, Agent, or Firm*—Kenyon & Kenyon

(57) ABSTRACT

A broker for the management of client requests issued by a client computer over a client-server network. Depending on its availability of resources, the broker determines whether to respond to the client request, or hand-off the client request to another server. The broker supports a virtual connection between the client and the other server, without interfering with communication protocols or disrupting client requests. The other server fulfills client requests by operating in place of the broker. The server terminates the virtual connection when all client requests have been completely fulfilled.

18 Claims, 6 Drawing Sheets

SYSTEM AND METHOD FOR MANAGING CLIENT REQUESTS IN CLIENT-SERVER NETWORKS

BACKGROUND OF THE INVENTION

1. Field of the Invention

The invention relates generally to computer networks technology. More particularly, this invention relates to the management of client requests in client-server based networks.

2. Description of the Related Technology

Internet Protocol (IP) is a network layer protocol used by many corporate networks, government networks, and the public Internet worldwide. IP network layer supports many personal, technical, and business applications, such as electronic mail, electronic fund transfers, medical records processing, and similar data transfers. IP is a connectionless network layer protocol that performs addressing, routing and control functions for transmitting and receiving datagrams over a network. The network layer routes packets from source to destination. An IP datagram is a data packet comprising a header part and a data part. The header part includes a fixed-length header segment and a variable-length optional segment. The data part includes the information being transmitted over the network. As a connectionless protocol, IP does not require a predefined path associated with a logical network connection. Hence, IP does not control data path usage. If a network device or line becomes unavailable, IP provides the mechanism needed to route datagrams around the affected area.

Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data re-transmissions, and multiplexing multiple connections through a single network connection. Finally, TCP is responsible for encapsulating information into a datagram structure.

Interprocess communication (IPC) transactions may occur across various computer networks using a variety of communication models. The dominant model for communicating between two computers is based on a client-server relationship. Using this relationship, a client computer (the "client") issues one or more command requests to a server computer (the "server"). The server fulfills client command requests by accessing necessary resources pursuant to the request, and executes applicable commands accordingly. The TCP/IP standard mandates IPC transactions to conform to this client-server relationship, which leads to a problem. As the number of clients increases, the ability of the server to meet the demands of clients diminishes. Hence, for instance, command requests from multiple clients for the transfer of files from same resource (e.g., server) require more time to fulfill by the host server. More importantly, multiple command requests destined to the same server creates data path congestion and slows down the network.

Several methods were used to deal with this congestion in the technology. The first method involves preallocating buffers for packets by dedicating memory space at intermediate (i.e., on route) servers to temporarily hold the packets. This method is costly to network operators. A second method involves discarding packets when there is no space to receive the packet at the destination host, or if a packet is not captured before a predetermined duration of time (e.g., 255 seconds). This method causes delay in the network because it requires retransmission of packets due to loss of data. A third method involves limiting the number of packets in the communication medium of a network (i.e., subnet). This method reduces network utility and increases issuance of busy network signals. A fourth method involves sending "choke" packets to the source server to slow down input rate when the server becomes overloaded. This method causes loss of data and requires retransmission of packets.

Moreover, when a server is overloaded, the server rejects a client request by advising the client to turn to another server. This approach requires an already existing client-server session to be terminated and the client application to be modified to support this functionality. Therefore, there is a need in the technology for a method to more efficiently manage server utilization in client-server based networks. The method should conform to existing communication protocols without interfering with established message and signaling structures.

SUMMARY OF THE INVENTION

To overcome the limitations of the related technology, the invention provides a system and method for the management of client-server requests in computer networks. The invention conforms to and supports existing communication protocols, such as TCP/IP, to relieve data path congestion due to multiple client requests. Moreover, applying the invention is transparent to clients, thereby avoiding disruption of already established client-server links.

One aspect of the invention includes a method of managing a client request in a client-server network having a client, a first server, and a second server. The method comprises the step of performing a handshake between the client and the first server, and between the first server and the second server. The method further comprises the step of forwarding the client request to the second server for execution, and responding to the client request by allowing the second server to function as the first server. In another aspect of the invention, a system for managing a client request in a client-server network is provided. The system comprises a client issuing a client request having a packet for execution over the client-server network. The system includes a first server receiving the client request from the client and modifying header information contained in the client request. The system further includes a second server responding to the client request with a response packet and pretending to be the first server.

BRIEF DESCRIPTION OF THE DRAWINGS

The above and other aspects, features and advantages of the invention will be better understood by referring to the following detailed description, which should be read in conjunction with the accompanying drawings, in which.

DETAILED DESCRIPTION OF THE PREFERRED EMBODIMENT

The invention provides a broker for the management of client requests in client-server computer networks. The invention supports existing communication protocols, such as TCP/IP, to relieve data path congestion due to multiple client requests. Moreover, applying the invention is transparent to clients, thereby avoiding disruption of already established client-server links. The "transparent" aspect of this invention refers to the ability of the broker to execute client requests by employing a third party server without the client's awareness that a third party server is being used.

Figure 1:
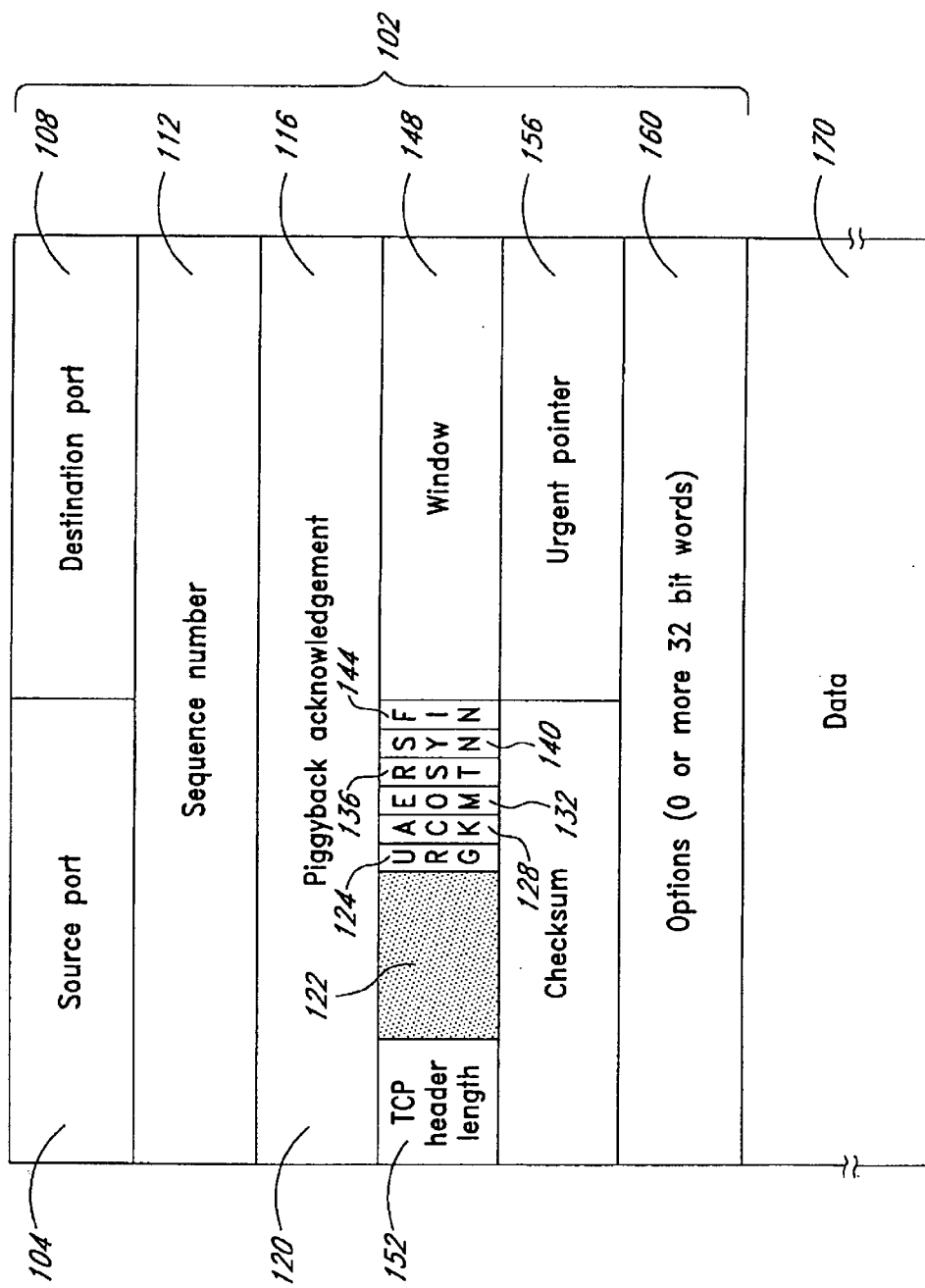
FIG. 1 is a block diagram describing the structure of a TCP transport packet of a transport layer.

To better understand the operation and advantages of the invention, a description of an exemplary packet structure is provided. FIG. 1 is a block diagram describing the structure of a TCP packet 100 in a transport layer. The term "packet" commonly refers to a unit of messages, including data and control signals, that is communicated in a network layer. The term "message" commonly refers to the user information or data being communicated. A message may be of any length, so it is up to the transport layer (i.e., TCP) to fragment or split the message into multiple packets for transmission.

As shown in FIG. 1, the TCP header 102 comprises a source port field 104 followed by a destination port field 108, each having 16 bits, to identify the end points of a network connection. The invention applies in supporting all system ports identified by the source port field 104. Each "host" computer may determine for itself how to allocate its ports. In a network, the term "host" commonly refers to one of a group of computers intended for running user applications (i.e., programs). The TCP header 102 further includes a sequence number field 112 followed by a piggyback acknowledgment field 116. TCP accepts arbitrarily long messages from user processes, breaks them up into TCP datagrams not exceeding 65,536 bytes, and sends each datagram as a separate packet. Hence, the sequence number 112 is a 32-bit word indicating the sequence of the datagram in the original message. The piggyback acknowledgment field 116 is used by a receiving computer to indicate receipt of a particular packet. A TCP header length field 120 of 4 bits follows the piggyback acknowledgment field 116 to indicate how many 32-bit words are contained in the TCP header 102. This information is needed because the header 102 includes a variable-length options field 160 which communicates data as may be agreed upon by the source host and destination host.

After several unused bits 122, the TCP header length 120 is followed by six 1-bit flags. The first 1-bit flag is URG 124 which is set to 1 if an urgent pointer 156 is used, and set to 0 otherwise. The urgent pointer 156 is used to indicate a byte offset from the current sequence number 112 at which urgent data are to be found. The second 1-bit flag is ACK 128 which is set to 1 when a packet bears an acknowledgment, and set to 0 otherwise. For instance, a connection reply bears an acknowledgment, so its ACK bit 128 is set to 1, and set to 0 otherwise. The third 1-bit flag is EOM 132 indicating the end of message when set to 1. The last packet of a message will have the EOM bit 132 set to 1. All other packets will have the EOM bit 132 set to 0. The fourth 1-bit flag is RST 136 which is used to reset a connection that has become confused due to a host delay or breakdown. A host delay may occur due to congestion of packets over the network. A host breakdown (commonly referred to as a "crash") may be caused by a variety of events, such as a power failure, a host processor reset, or an error in the host application software. The fifth 1-bit flag is SYN 140 which is used to establish synchronization for a connection request. A connection request has a SYN bit 140 set to 1 and ACK bit 128 set to 0 to indicate that the piggyback acknowledgment 116 is not in use. As noted above, the connection reply does bear an acknowledgment with its SYN bit 140 and ACK bit 128 set to 1. The sixth 1 bit flag is FIN 144 which indicates release of a connection. The FIN bit 144 is set to 1 to indicate that the sender has no more data, and set to 0 otherwise.

Flow control in TCP is handled using a variable-size sliding window. A 16-bit window field 148 is used to indicate how many bytes may a source host send beyond the number of bytes acknowledged by a destination host. The window field 148 is followed by a checksum field 152 to provide reliable connections. An error in transmission can be detected by the destination host by computing the checksum in the same way as the source host and comparing it against the value in the checksum field 152. The value in the checksum field 152 is calculated by the source host by adding up all the data, regarded as 16-bit words, and then converting the resulting sum to its 1's complement, a standard computer operation. The checksum field 152 is followed by the above-described urgent pointer field 156. An options field 160 follows the urgent pointer field 156 to communicate optional data, such as buffer sizes during the link setup procedure. The options field 160 is followed by a data field 170. The data field 170 comprises the message being communicated over the computer network. For instance, the message could be a word processing document, a computer program, a digital image, digitized voice information for a phone call, an electronic mail message and so forth.

Figure 2:
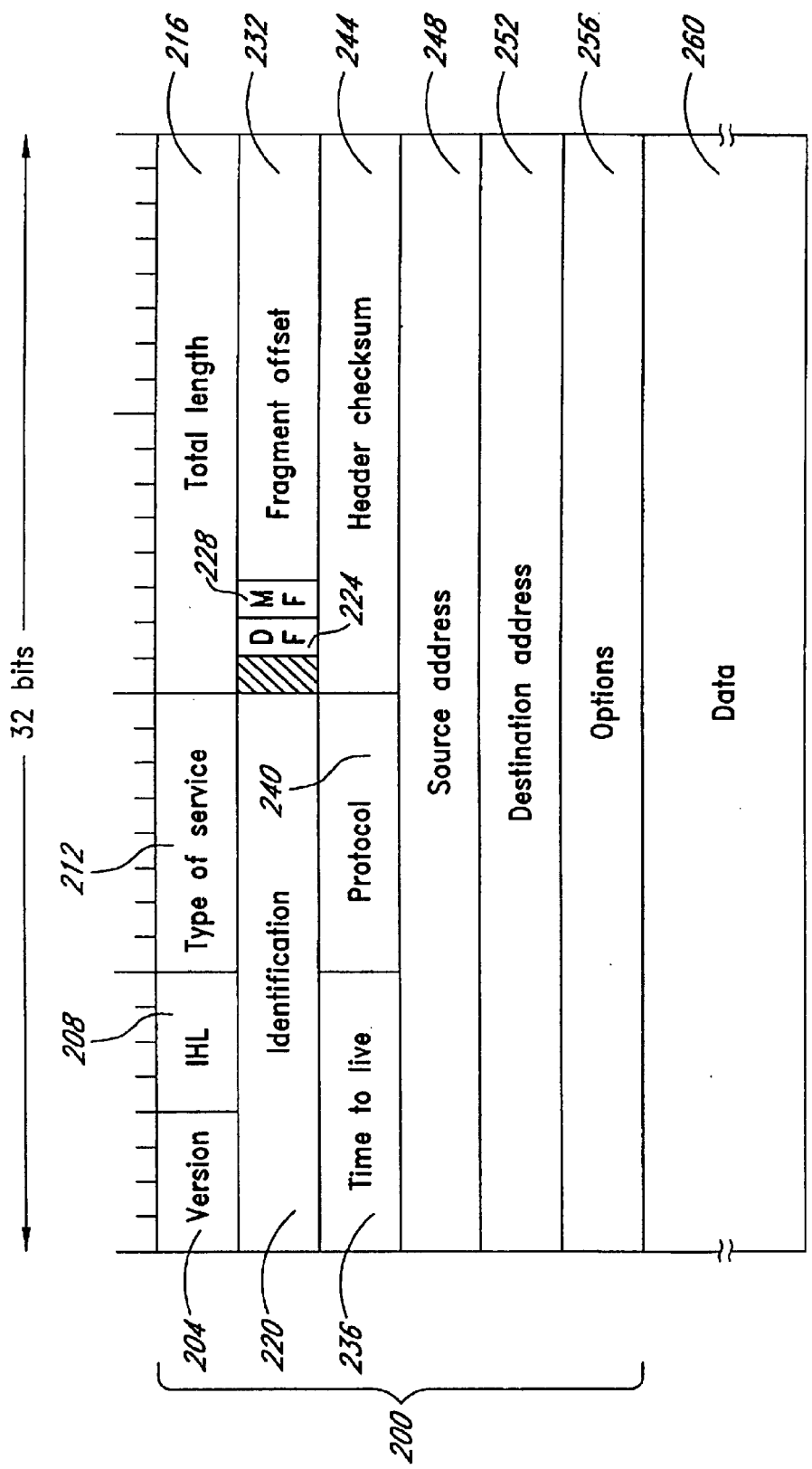
FIG. 2 is a block diagram describing the structure of an IP header of a network layer.

FIG. 2 is a block diagram describing the structure of an IP header in the network layer. As noted above, an IP datagram comprises an IP header 200 followed by a data field 260. The IP header 200 includes a 20-byte fixed part and a variable length optional part. The 20-byte fixed part of the IP header 200 includes a version field 204 which keeps track to which version of the Internet protocol the datagram belongs. By including the version 204 in each datagram, it is possible to change protocols while the network is operating. Since the IP header 200 is not constant in length, an IP header length (IHL) field 208 in the IP header 200 is provided to indicate the length of the IP header 200 in 32-bit words. By definition of the IP, the minimum value of the IHL 208 is 5. The IHL field 208 is followed by a "type of service" field 212 which allows the host computer to inform the subnet the kind of service required. Various combinations of reliability and speed are possible by predefined service types. The "type of service" field 212 is followed by a "total length" field 216 which includes the total number of all bits in the datagram, i.e., both header and data bits. The maximum size of the "total length" field 216 is 65,536 bytes.

The IP network layer may break up each TCP datagram into smaller fragments across the network. The elementary fragment unit is 8 bytes. Since the size of a datagram is a maximum of 65,536 bytes, there is a maximum of 8192 fragments per datagram. Hence, after the "total length" field 216, an identification field 220 is used to allow the destination host computer to determine to which datagram a newly arriving fragment belongs. All fragments belonging to the same datagram contain the same value in the identification field 220. After an unused bit, two 1 bit fields follow the identification field 220. The first 1-bit field is a "don't fragment" ("DF") bit 224. When the DF bit 224 is set to 1, network gateways are instructed not to fragment the datagram because the destination is incapable of reconstructing the fragments together into their original datagram. The second 1-bit field is a "more fragments" ("MF") bit 228. The MF bit 228 is used as a double check against the total length field 216 to ensure that no fragments are missing from the reconstructed datagram. Except for the last fragment, all message fragments have the MF bit 228 set to 1. The two 1-bit fields are followed by a "fragment offset" field 232 which indicates the location or order of the current fragment in the datagram. As shown in FIG. 2, the "fragment offset" field 232 consists of 13 bits and, hence, there is a maximum of 8192 possible message fragments for each datagram. The "fragment offset" field 232 is followed by a "time to live" field 236 which is a counter used to limit packet lifetimes. Typically, a network gateway destroys packets having a lifetime exceeding 255 seconds.

After the IP network layer at the destination host constructs a complete datagram, the IP network layer utilizes a protocol field 240 to indicate the transport protocol. TCP is one transport protocol, but other protocols such as transport protocols specified by the Open Systems Interconnection (OSI) standard (e.g., ISO 8073) may be used. A header checksum field 244 follows the protocol field 240 to verify the validity of the IP header 200. The header checksum 244 is useful because the IP header 200 may change at a gateway, e.g., due to fragmentation into multiple fragments. A "source address" field 248 follows the header checksum 244 to indicate the source network number and host number of the data portion of the datagram. Finally, a destination address field 252 follows the source address field 244 to indicate the destination network number and host number of the data portion.

Figure 3:
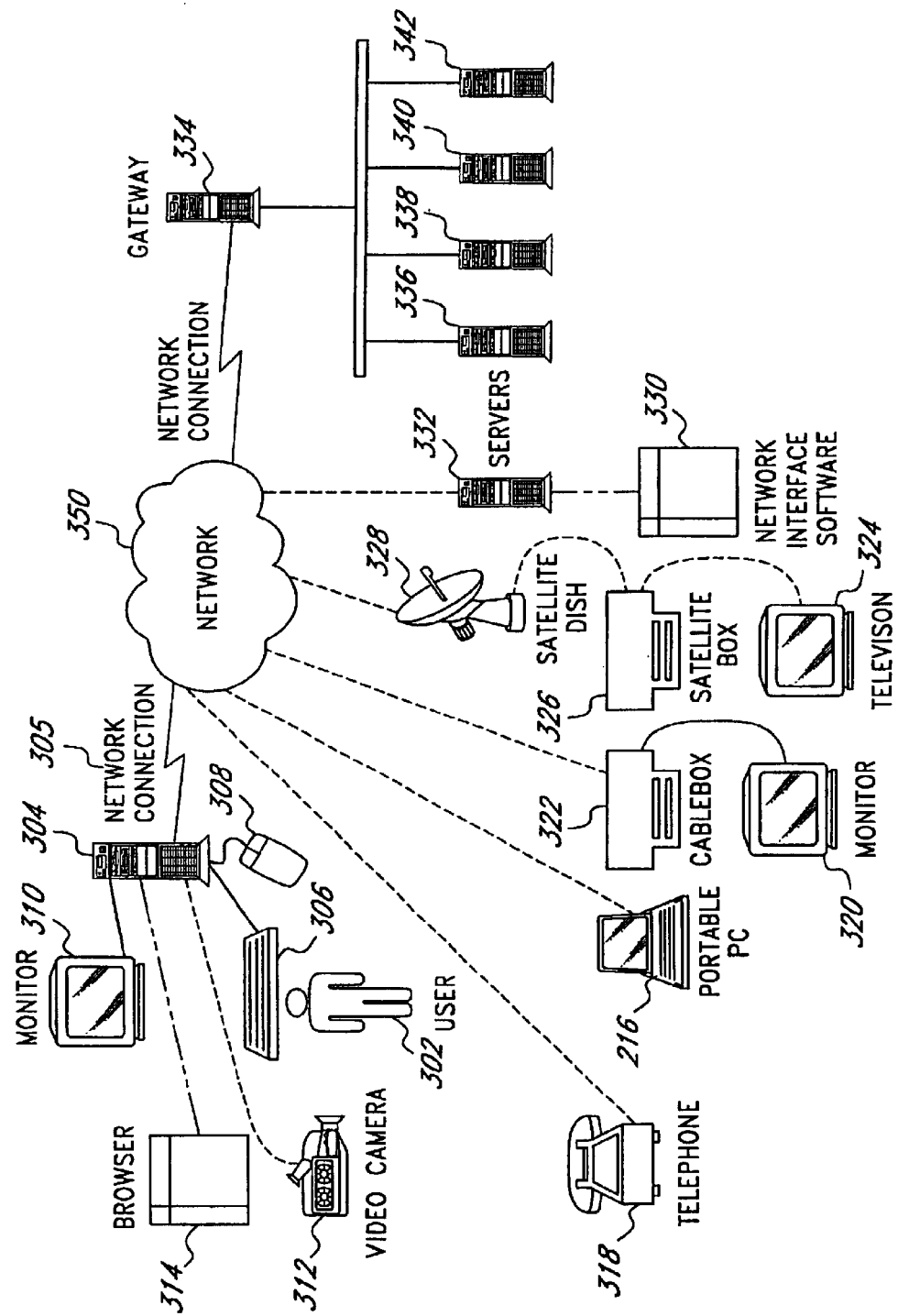
FIG. 3 is a block diagram of an exemplary network.

FIG. 3 is a block diagram of a network with its exemplary peripheral equipment. As shown in FIG. 3, a computer user 302 may connect to a network medium 350 using any of various computing devices. One possible interface device may be a computer 304 connected to the network medium 350 via a network connection. Typically, the network connection 305 is provided to the user 302 by a network service provider. In case of the public Internet, for instance, the service provider may be a national service provider such as America On-Line (AOL), Microsoft Network (MSN), an educational or governmental institution, or a local service provider. The computer 304 may be, for example, any industry standard machine such as an IBM-PC (or compatible) or an Apple Macintosh. The computer 304 may also be a proprietary machine. The computer 304 may include a keyboard 306, a mouse 308, a monitor 310, and a video camera 312. Additionally, the user 302 may use a network interface software 314 (e.g., Microsoft Internet Explorer, or Netscape Navigator/Communicator), to communicate over the network medium 350. Alternatively, the user 302 may use a portable personal computer (PC) 316 or a telephonic device 318 equipped with proper network interface software to interface to the network medium 350. The user 302 may alternatively use a monitor 320 connected to a cable box 322 equipped with proper network interface software to interface with the network medium 350. Furthermore, using a satellite (not shown), the user may employ a standard television set 324 connected to a satellite box 326 to communicate with the network medium through a satellite antenna 328. Finally, the user 302 may employ a network interface software in a dedicated server 332 to communicate over the network medium 350. Accordingly, numerous variations in the type of interface equipment may be accommodated in applying this invention.

Using any of the above interface equipment, the user 302 issues client command requests to conduct a communication session with a destination server. A destination server may be one of the servers 334, 336, 338, 340, or 342. These servers are computing devices having large persistent memories such as multi-Gigabyte hard disk drives. The drives contain file resources which are accessible to clients. As noted in FIG. 3, the servers may be part of a local area network (LAN) or wide area network (WAN) connected via proper interface links (e.g., Ethernet). For example, using the TCP/IP protocols, the user 302 interfaces with the network medium 350 to send an electronic mail (e-mail) message to a distant user (not shown) whose e-mail account is resident on the destination server 342. The type of command requests depend on the network interface software used by the user 302. When using Eudora, for instance, the user 302 can transmit a command request to send an e-mail message by clicking on the icon "send" appearing inside a graphical window on a monitor screen. In response to the "send" command, the e-mail message is transmitted in conformance with the TCP/IP protocols over the network 350 to its destination server 342.

Figure 4:
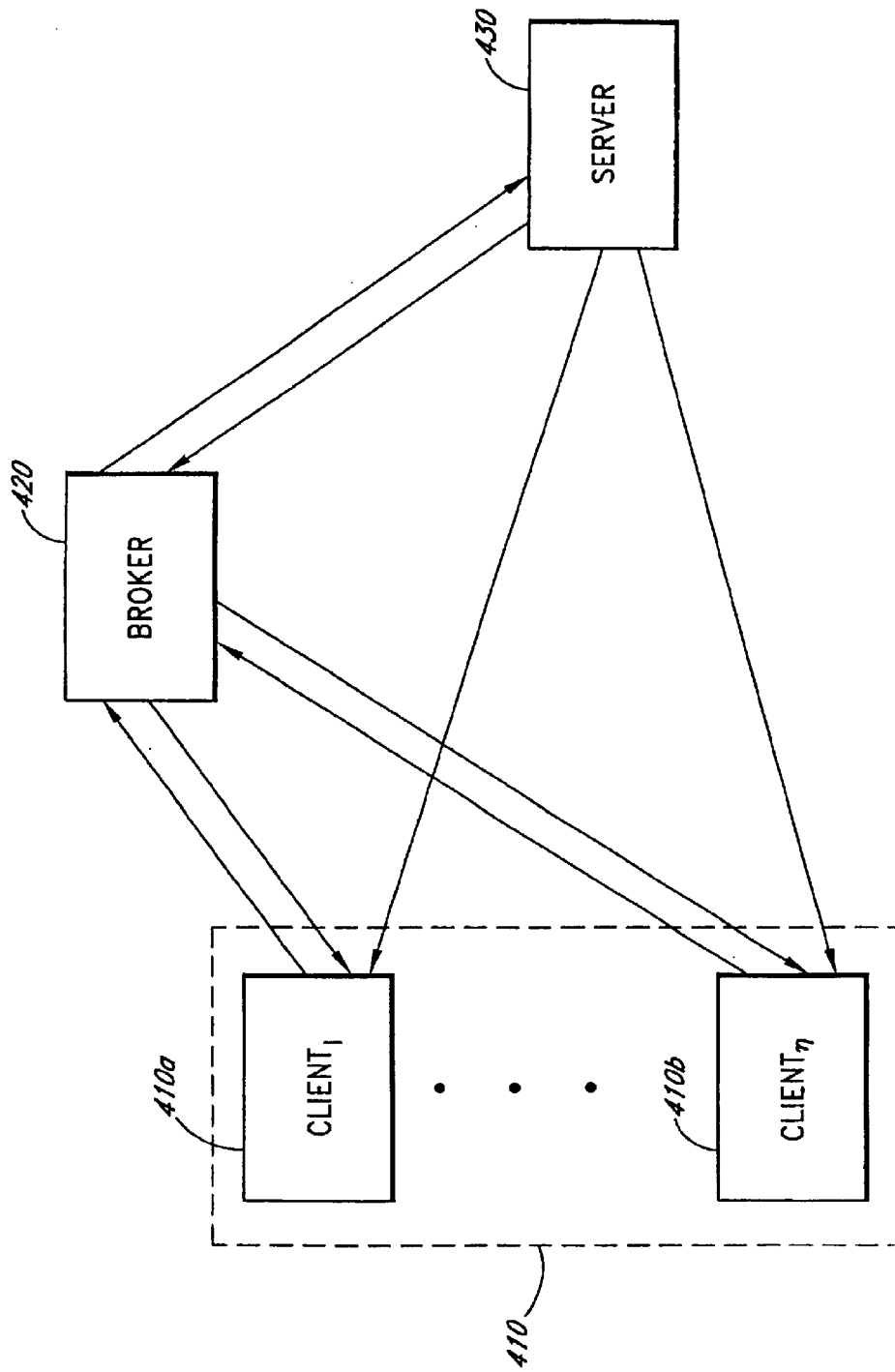
FIG. 4 is a block diagram of a client-server network used by the invention.

FIG. 4 is a functional block diagram of a client-server network applying the invention. As shown in FIG. 4, one or more clients 410 (two clients 410a and 410b are shown, but the invention operates with anywhere from 1 to n clients, where n is a positive integer) communicate with a broker server 420 (the "broker") through various networks using one or more communication protocols, such as the TCP/IP protocols. Also, there may be many brokers 420 and servers 430 in the network but, for ease of explanation, only one of each is shown in FIG. 4. The clients 410, broker 420 and server 430, may be any type of computing device as shown in FIG. 3.

In a typical TCP/IP session, the client 410 initiates a communication request with the broker 420 by informing the operating system (O.S.) of the network facilities (not shown in this figure) of its intent to connect to a particular server (i.e., the broker 420). The O.S. may be any industry standard system such as the Berkeley Software Development, Inc. (BSDI) O.S. (UNIX-based), Microsoft Disk Operating System (DOS), Apple Macintosh O.S., Novell Netware, AT&T UNIX, DEC VMS, or Microsoft Windows 3.1/95/98/NT. Pursuant to this request, the O.S. may directly or indirectly support the TCP/IP protocols to establish a communication link with the particular server by performing a "handshake." The transport layer software accomplishes the handshake by transmitting a packet, which may contain no data, having a SYN bit 140 set to 1 (FIG. 1) from the client 410 to the broker 420. Upon receiving the packet, the broker 420 is alerted that a connection is being requested from the client 410. The broker 420 responds by transmitting a packet, having the ACK bit 128 set to 1 (FIG. 1), to the client 410. Typically, the client 410, in turn, acknowledges the acknowledgment of the broker 420 by transmitting a packet, having an ACK bit 128 set to 1, to the application software at the broker 420. As noted above, the TCP/IP layers direct transmitted packets to the proper destination server based on information contained in the destination address field 252 (FIG. 2). Once the handshake is completed, the client 410 and broker 420 establish a virtual connection ("link") to support a communication session. This link is necessary to allow a client to communicate across the network.

Depending on the availability of resources of the broker 420, the broker 420 determines whether to execute incoming client command requests, or hand-off client command requests to a third party server for execution, e.g., the server 430. "Availability of resources" refers to the ability of the broker 420 to communicate with the application software employed by the client 410. The broker 420 is able to communicate with the client's application software when the broker 420 is equipped with an application software that is compatible with that employed by the client 410. The client 410 may be a user accessing the World Wide Web through an internet connection provided by a local service provider. The user may, for instance, employ Netscape Navigator as the client's application software to transmit a command request. The command request may be a request to download a particular file (e.g., a text file, an image file, or an application software). The method of issuing such a command request depends on the web browser run by the client 410. When using Netscape Navigator, a user may transmit a "download" command request by clicking on a highlighted portion of a text appearing in the window of interest on the monitor screen. The "download" command may be a markup tag based on a hypertext markup language (HTML). The application software may be any IP-based application software which is well known in the art, including applications which support file transfer protocol (FTP), simple mail transfer protocol (SMTP), domain name system (DNS), and hypertext transfer protocol (HTTP). If the broker 420 determines that it is equipped with the application software which is operable with Netscape Navigator, the broker 420 transmits response packets to the client 410 with the desired data. If, on the other hand, the broker 420 is not equipped with the required application software, the broker 420 hands-off client commands to the server 430.

As noted above, there are several third party servers which can be used in a network, but only the server 430 is shown in FIG. 4. Before handing-off client requests to a server, the broker 420 determines which server may be used for hand-off. To make this determination, a system operator programs the broker 420 with a list of servers from which the broker 420 selects a third party server. To select a server having the requested resource, the broker 420 may employ any desired selection method such as choosing a server by sequence, randomly, or using other desired criteria. The goal of the hand-off is to load-balance the request responses by the servers. Once the broker 420 selects the server 430, the server 430 establishes a link with the client 410 under the management of the broker 420 to provide the requested data to the client 410.

Figure 5:
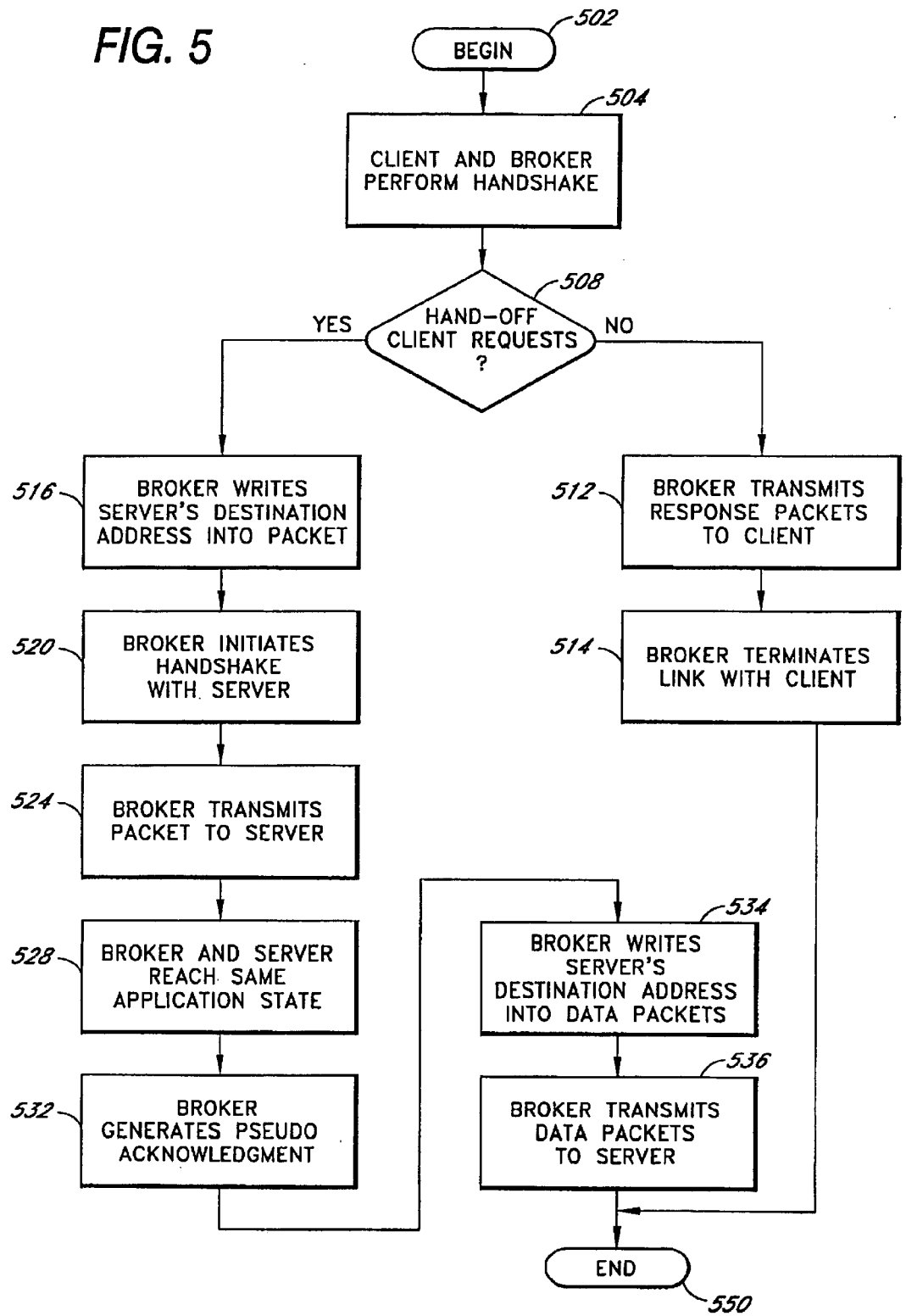
FIG. 5 is a flowchart describing the decisional steps executed by the broker shown in FIG. 4.

FIG. 5 is a flowchart describing the control flow executed by the broker 420 (FIG. 4). In one embodiment, the invention may be implemented using the BSDI operating system. The BSDI operating system includes a TCP/IP networking capability by incorporating the Netscape FastTrack and Apache Web servers, Post Office and BSD's sendmail E-mail servers, FTP, Netnews, and BSDI's MaxIM graphical Internet manager. Alternatively, acting as its own router, the BSDI server supports point-to-point protocol (PPP) and serial line internet protocol (SLIP) over a modem for dial-up communications. In one embodiment, the invention employs the Berkeley Socket application programming interface (API) to communicate with remote hosts on a network. The Berkeley Socket API is a set of C function calls used to support network communication. The Sockets API is not limited for use with the TCP/IP protocol, and may be used with other network protocols. In client computers (e.g., the client 410) using a TCP/IP protocol, the function calls include: socket( ), bind( ), connect( ), send ( ), recv( ), and close( ). In server computers (e.g., the broker 420), the function calls include: socket( ), bind( ), listen( ), accept( ), send( ), recv( ), and close( ). These function calls are well known in the art.

Beginning at block 502, the broker 420 performs the management of client command requests function. At block 504, the client 410 and broker 420 perform the above-described handshake using a transport and network layer communication protocol such as TCP/IP, thereby establishing a link between them. In one implementation, the application software executes an accept( ) function call to set the broker 420 into a dormant state. The dormant state remains in effect until another connection is established with the broker 420. At block 508, the broker 420 determines whether to execute incoming client command requests, or hand-off client command requests to a third party server for execution, e.g., the server 430. As described above, the broker 420 makes this determination based on availability of appropriate resources. If the broker 420 decides to fulfill client command requests, at block 512, the broker 420 accepts incoming client command requests for execution, and responds to the client 410 accordingly. In one implementation, the broker 420 responds to the client 410 using Berkeley Socket APIs, e.g., read ( ) and write ( ) function calls to read and write data, respectively. When transmission of data is complete (i.e., the session is complete) the application software executes a close( ) function call to terminate the link between the broker 420 and the client 410. Accordingly, at block 514, the broker 420 transmits a packet having a FIN bit 144 (FIG. 1) set to 1 to the client 410. The management of client command requests function terminates at block 550.

If, on the other hand, the broker 420 decides to forward the request to the server 430 (FIG. 4), the application software executes a hand-off system call to instruct the operating system to hand-off the current client-broker session to the server 430. Accordingly, at block 516, the broker 420 modifies its destination address 252 of the IP header 200 (FIG. 2) by writing the destination address of the server 430 in the destination address field 252. For example, the destination address of the broker 420 may be represented as 11001100110011001100110011001100 in the destination address field 252. If the destination address of the server 430 is represented as 10101010101010101010101010101010, then the broker 420 replaces its destination address by 10101010101010101010101010101010 in the destination address field 252. As described above, the broker 420 may have several third-party servers to use for this purpose. At block 520, the broker 420 initiates a handshake with the server 430 to negotiate and establish a TCP/IP session between the broker 420 and server 430. In effect, the broker-server link establishes an indirect client-server link.

At block 524, the broker 420 transmits to the server 430 a packet which in this embodiment, except for the destination address field 252, is substantially identical to the packet received from the client 410 having the SYN bit 140 set to 1. The packet may not be exactly identical to the client packet because other fields (e.g., sequence number field 112, piggyback acknowledgment field 116) may be modified by the broker 420. For instance, modifying the sequence number field 112 may be necessary because the broker 420 may generate a sequence number for the packets that is different than the sequence number generated by the client 410. A packet having a destination address of the server 430 triggers the server 430 to respond to the broker 420 with an acknowledgment response packet having an ACK bit 128 set to 1. When the server 430 is ready to accept the handshake request from the broker 420, the server 430 transmits a packet having the ACK bit 128 set to 1 to the broker 420. Typically, upon receiving the packet having the ACK bit 128 set to 1, the broker 420 responds to the server 430 by transmitting a packet having the ACK bit 128 set to 1 to acknowledge the acknowledgment. Hence, the broker 420 and the server 430 may exchange several packets until the server 430 and the broker 420 are in the same application state at block 528. The application state of the broker 420 is the same as that of the server 430 when the broker 420 is ready to send and the server 430 is ready to receive message information. Since the client 410 already has a link established with the broker 420, no link is needed to be established between the client 410 and the server 430. The client 410 transmits packets to the server 430 through the broker 420. At block 532, the broker 420 generates a pseudo acknowledgment packet to the client 410. The pseudo acknowledgment is generated after the broker 420 receives the acknowledgment packet from the server 430. Moreover, the pseudo acknowledgment packet is transparent to the client 410 and, hence, does not disrupt the link already established between the client 410 and broker 420.

At block 534, for all data packets received from the client 410, the broker 420 modifies its destination address (FIG. 2) by writing the destination address of the server 430 in the destination address field 252. For the purpose of this section, a data packet refers to a packet containing the application commands issued by the client (e.g., commands to download a file, send an e-mail message, etc.). At block 536, the broker 420 transmits to the server 430 all data packets received from the client 410. Typically, all servers in the network, including the broker 420, are connected to one or more respective packet switch nodes (PSNs). All packet traffic to or from the server flows through its PSN. Packets are buffered at both the sending PSN and receiving PSN. The size of available buffering at each PSN depends on the data link layer employed by the servers. Accordingly, the PSN of the broker 420 cooperates with the broker 420 to forward all data packets to the server 430. Additionally, if necessary, the broker 420 modifies information contained in the sequence number field 112 and piggyback acknowledgment field 116. As noted above, modifying the sequence number field 112 may be necessary because the broker 420 may generate a sequence number for the packets that is different than the sequence number generated by the client 410. The broker 420 continues to forward packets from the client 410 to the server 430 until all data packets reach the server 430. The process terminates upon delivery of all data packets to the server 430 at block 550.

Figure 6:
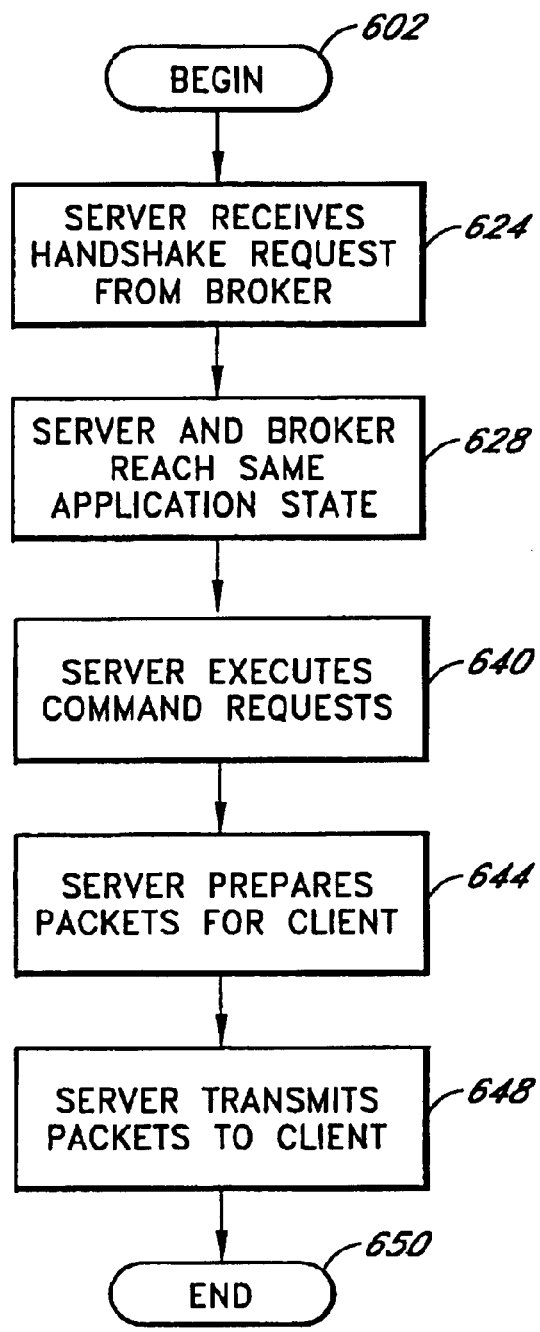
FIG. 6 is a flowchart describing the decisional steps executed by the server shown in FIG. 4.

FIG. 6 is a flowchart describing the decisional steps executed by the server shown in FIG. 4. Beginning at block 602, the server 430 cooperates with the broker 420 to respond to client command requests. At block 624, the server 430 receives from the broker 420 the packet having the SYN bit 140 set to 1 requesting completion of a handshake between them. The broker 420 initiates the handshake in response to a hand-off system call instructing the O.S. to hand-off the client-broker session to the server 430. When the server 430 is ready to accept the handshake request from the broker 420, the server 430 transmits a packet having the ACK bit 128 set to 1 to the broker 420. Typically, upon receiving the packet having the ACK bit 128 set to 1, the broker 420 responds to the server 430 by transmitting a packet having the ACK bit 128 set to 1 to acknowledge the acknowledgment. Hence, the broker 420 and the server 430 may exchange several packets until the server 430 and the broker 420 are in the same application state at block 628. As noted above, the application state of the broker 420 is the same as that of the server 430 when the broker 420 is ready to send and the server 430 is ready to receive message information.

At block 640, the server 430 receives data packets from the broker 420 to execute command requests of the client 410. The server 430 may employ a peripheral driver to receive data packets using user datagram protocol (UDP). UDP allows users to send messages without establishing a particular connection. UDP is often referred to as a user interface to IP. As is well known in the art, a UDP packet comprises a source port field, a destination port field, a length field, a checksum field, and a data field. The source port indicates the address of the source server (e.g., the broker 420). The destination port indicates the address of the destination server (e.g., the server 430). The length field represents the size of the UDP packet. As in TCP/IP, the checksum field contains the rsults from a checksum algorithm to provide reliable data transmission. The data field is a variable length field which contains the data being transmitted in the UDP packet. The command requests are typically embedded in the data field 260 (FIG. 2) of data packets. At block 644, in response to the command requests, the server 430 generates and prepares outgoing packets for transmission to the client 410. The O.S. instructs the application software in the server 430 to modify information contained in the source address field 248 (FIG. 2) by writing the source address of the broker 420 in the source address field 248 for all outgoing packets. By writing the source address of the broker 430 in place of its source address, the server 430 causes the client 410 to believe that the information is being sent by the broker 420. Additionally, if necessary, the server 430 modifies information contained in the sequence number field 112 to indicate the sequence number used by the client 410. As noted above, modifying information in the sequence number field 112 may be necessary because the broker 420 may generate a sequence number for the packets that is different than the sequence number generated by the client 410. Finally, at block 648, the server 420 transmits packets having the destination address of the client 410 to the network for delivery to the client 410. The process terminates upon delivery of all required packets at block 650.

In view of the foregoing, it will be appreciated that the invention overcomes the longstanding need for a system and method for managing client command requests in client-server based networks by effectively utilizing server resources. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which fall within the meaning and range of equivalency of the claims are to be embraced within their scope.

What is claimed is:

1. A method of managing a client request in a client-server network having a client, a first server, and a second server, the method comprising:

performing a handshake between the client and the first server;

determining whether to fulfill the client request by the first server;

selecting the second server, when the client request cannot be fulfilled by the first server;

performing a handshake between the first server and the second server;

forwarding the client request to the second server for execution, the forwarding being transparent to the client; and responding to the client by a one-way direct data transmission from the second server to the client.

2. The method as claimed in claim 1, wherein determining whether to fulfill the client request includes determining if the first server is equipped with an appropriate resource.

3. The method as claimed in claim 1, wherein forwarding the client request to the second server includes writing the destination address of the second server in a packet received from the client.

4. The method as claimed in claim 3, wherein forwarding the client request to the second server includes transmitting the packet to the second server.

5. The method as claimed in claim 1, further comprising the step of sending an acknowledgment by the first server to the client after receiving an acknowledgment packet from the second server.

6. The method as claimed in claim 1, wherein responding to the client includes forwarding client data to the second server.

7. The method as claimed in claim 1, wherein responding to the client includes writing the source address of the first server in a response packet transmitted by the second server.

8. The method as claimed in claim 7, wherein responding to the client includes transmitting the response packet to the client.

9. A system for managing a client request in a client-server network, the system comprising:

a first server configured to perform a handshake with a client and determine whether to fulfill a client request that is received from the client via the network, the first server being further configured to select another server, when the client request cannot be fulfilled by the first server; and a second server configured to perform a handshake with the first server and transparently fulfill the client request with a response packet transmitted to the client by one-way direct data transmission, when the client request cannot be fulfilled by the first server.

10. The system as claimed in claim 9, wherein the first server is connected to the client and the second server.

11. The system as claimed in claim 9, wherein the first server writes the destination address of the second server in a packet representative of the client request.

12. The system as claimed in claim 11, where the first server forwards the packet to the second server.

13. The system as claimed in claim 9, wherein the first server sends an acknowledgment to the client.

14. The system as claimed in claim 9, wherein the first server forwards client data to the second server.

15. The system as claimed in claim 9, wherein the first server writes the source address of the first server in the response packet.

16. A program storage device storing instructions that when executed by a computer perform the method comprising:

performing a handshake between a client and a server;

determining whether to fulfill a client request by the server;

selecting another server, when the client request cannot be fulfilled by the server;

performing a handshake between the server and the other server;

forwarding the client request to the other server for execution, the forwarding being transparent to the client; and responding by the other server with a one-way direct data transmission to the client.

17. A system for managing a client request in a client-server network having a client, a first server, and a second server, the system comprising:

means for performing a handshake between a client and the first server;

means for determining whether to fulfill a client request by the first server;

means for selecting the second server, when the client request cannot be fulfilled by the first server;

means for performing a handshake between the first server and the second server;

means for transparently forwarding the client request to the second server for execution; and means for responding to the client by one-way direct data transmission from the second server to the client.

18. A system for managing a client request in a client-server network, the system comprising:

a first server configured to receive a client request from a client via the network and determine whether to fulfill the request using a resource of the first server, wherein the first server hands off the client request to another client in the event that the resource is unavailable; and a second server configured to establish a link with and receive the client request from the first server via the network, when the first server hands off the client request, and wherein the second server is configured to transparently respond to the client by a one-way direct data transmission from the second server to the client.

* * * * *